(12) United States Patent
Grote et al.

(10) Patent No.: US 8,129,301 B2
(45) Date of Patent: Mar. 6, 2012

(54) MOLDING COMPOUND FOR PRODUCING A FIREPROOF LINING

(75) Inventors: Holger Grote, Mülheim (DE); Margarete Herz, Ewighausen (DE); Wolfgang Kollenberg, Brühl (DE); Christine Rasch, Limburg (DE); Marc Tertilt, Hattingen (DE)

(73) Assignee: Siemens Aktiengesellschaft, Munich (DE)

( * ) Notice: Subject to any disclaimer, the term of this patent is extended or adjusted under 35 U.S.C. 154(b) by 141 days.

(21) Appl. No.: 12/085,276

(22) PCT Filed: Nov. 6, 2006

(86) PCT No.: PCT/EP2006/068114
§ 371 (c)(1),
(2), (4) Date: Apr. 14, 2009

(87) PCT Pub. No.: WO2007/057315
PCT Pub. Date: May 24, 2007

(65) Prior Publication Data
US 2009/0227443 A1  Sep. 10, 2009

(30) Foreign Application Priority Data
Nov. 21, 2005  (EP) .................................... 05025360

(51) Int. Cl.
*C04B 35/567* (2006.01)
*C04B 35/18* (2006.01)
(52) U.S. Cl. .............................. 501/88; 501/89; 501/128
(58) Field of Classification Search .................... 501/88, 501/89, 128
See application file for complete search history.

(56) References Cited

U.S. PATENT DOCUMENTS

| 3,230,100 | A | * | 1/1966 | Miller, Jr. et al. | 501/89 |
| 4,093,470 | A | * | 6/1978 | Cherry | 501/89 |
| 4,104,075 | A | * | 8/1978 | Hayashi et al. | 501/89 |
| 4,800,181 | A | | 1/1989 | Lassiter et al. | |
| 5,494,267 | A | * | 2/1996 | Anderson et al. | 266/281 |
| 5,869,145 | A | * | 2/1999 | Iwasaki et al. | 427/427 |
| 6,277,446 | B1 | * | 8/2001 | Tanaka et al. | 427/421.1 |
| 6,491,862 | B1 | * | 12/2002 | Hong et al. | 264/651 |

FOREIGN PATENT DOCUMENTS

| CN | 86100725 A | | 8/1986 |
| DE | 294701 | * | 10/1991 |
| DE | 42 42 610 A1 | | 7/1993 |
| DE | 10053832 | * | 10/2001 |
| JP | 07206556 | * | 8/1995 |
| JP | 07315933 | * | 12/1995 |
| JP | 10 279357 A | | 10/1998 |
| JP | 10 281653 A | | 10/1998 |
| RU | 2257361 | * | 7/2005 |
| SU | 361159 | * | 3/1971 |
| SU | 361 159 A | | 12/1972 |
| WO | 9403410 | * | 2/1994 |
| WO | WO 94/03410 | | 2/1994 |

OTHER PUBLICATIONS

Gerald Routschka: "Pocket Manual Refractory Materials", 1997, p. 74-80, Vulkan-Verlag Essen, XP002379190.
Database WPI, Section Ch, Week 197330 Derwent Publicatin Ltd., London, GB, AN 1973-42263U XP002398872.
Communication/Office Action, Republic of China Patent Office, Jun. 30, 2011, pp. 1-2.

* cited by examiner

Primary Examiner — Karl Group

(57) ABSTRACT

Disclosed is a molding compound for producing a fireproof lining, especially for a combustion chamber of a stationary gas turbine. Said molding compound is characterized particularly by the fact that the molding compound is formed from more than about 50 percent by weight of silicon carbide and less than about 50 percent by weight of aluminum silicate.

7 Claims, 1 Drawing Sheet

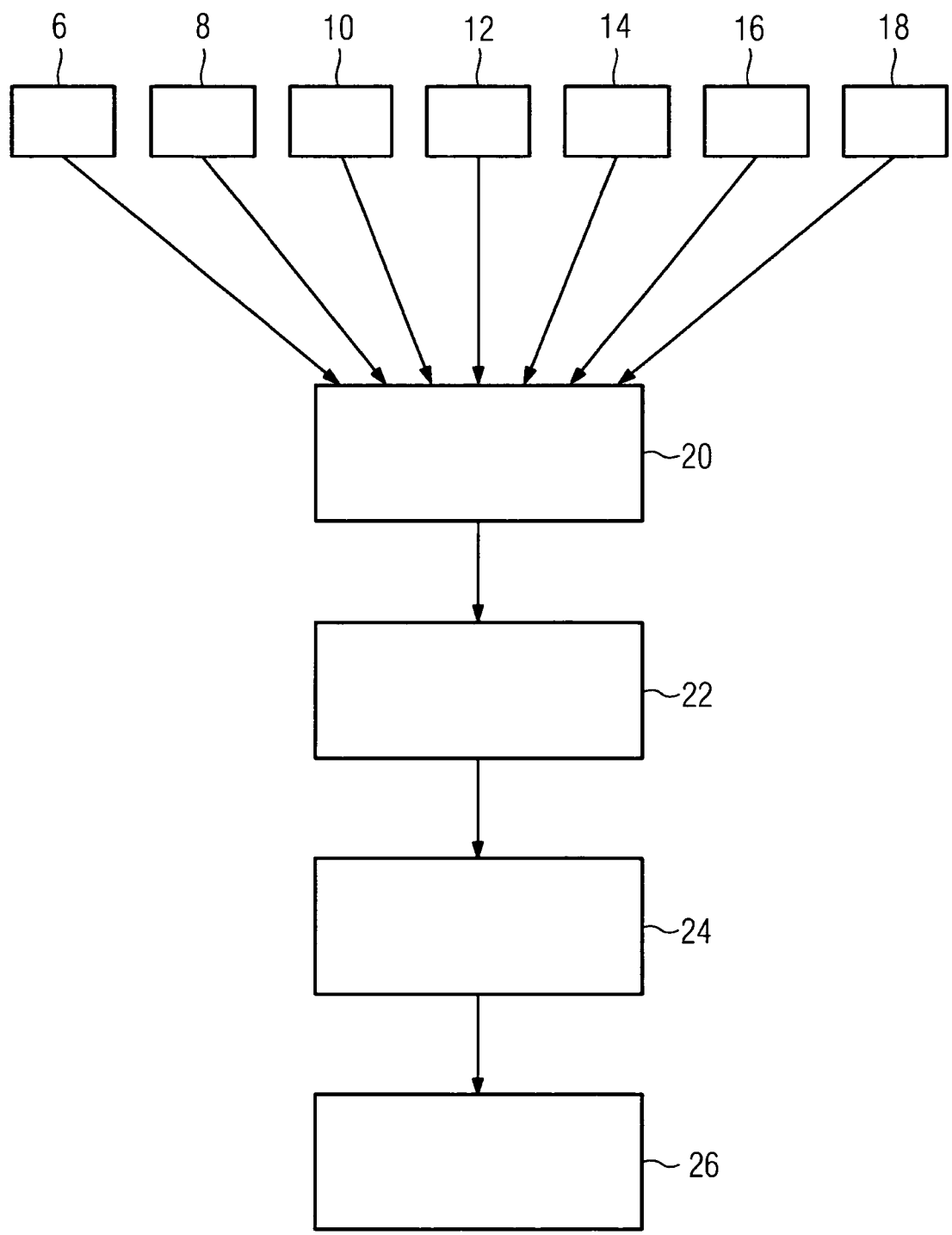

MOLDING COMPOUND FOR PRODUCING A FIREPROOF LINING

CROSS REFERENCE TO RELATED APPLICATIONS

This application is the US National Stage of International Application No. PCT/EP2006/068114, filed Nov. 6, 2006 and claims the benefit thereof. The International Application claims the benefits of European application No. 05025360.8 filed Nov. 21, 2005, both of the applications are incorporated by reference herein in their entirety.

FIELD OF INVENTION

The invention relates to a molding compound for producing a fireproof lining, especially for a combustion chamber of a stationary gas turbine. Furthermore, the invention relates to a fired molded part produced on the basis of such a molding compound, an associated fireproof lining and also a method for producing a fired molded part of a fireproof lining.

BACKGROUND OF THE INVENTION

In combustion chamber technology, as for example in gas turbine combustion chambers, the walls of high-temperature reactors have to be protected with suitable linings or shields, so that in particular load-bearing structures located behind them are protected against attack by hot gas. Ceramic materials are as a rule more suitable for the shield than metallic materials because they exhibit higher temperature and corrosion resistance as well as lower heat conductivity.

The ceramic linings, which are often also referred to as ceramic heat shields, are as a rule produced by a sintering process, in which the protecting properties of the ceramics are also fixed.

In addition, the ceramic heat shields have to meet high requirements with regard to their mechanical loading capacity, and increasing attempts are being made to achieve improvements by producing composite components, for example with fiber-reinforced components on the basis of CMC (ceramic matrix composites), or to attain particularly good mechanical properties with structural ceramic components or graduated components.

SUMMARY OF INVENTION

One object of the invention is to provide a molding compound and a molded part fired from it to produce a fireproof lining of the type mentioned above which can be processed with an e.g. comparatively low sintering temperature and which therefore opens up new possibilities for the development of high-temperature-resistant composite components.

The molding compound must meet the requirements applying to ceramic components for use in the hot gas path or in the combustion chamber of stationary gas turbines.

The object is achieved in accordance with the invention by means of a molding compound for producing a fireproof lining which is formed from more than about 50% by weight of silicon carbide and less than 50% by weight of aluminum silicate. The object is further achieved by means of a fired molded part for a fireproof lining which contains more than about 70% and less than about 90% by weight of silicon carbide and/or more than about 10% and less than about 50% by weight of aluminum silicate. Moreover, the object is also achieved in accordance with the invention by means of a method for the production of a fired molded part for a fireproof lining which encompasses the following steps: production of a molding compound with at least the constituents silicon carbide, microsilica, aluminum oxide and aluminum silicate with the addition of colloidal silicic acid solution, casting of the molding compound under vibration, sudden reduction of the temperature of the molding compound, and drying and firing of the cast molding compound.

The molding compound composed in accordance with the invention from the stated specific percentages by weight of silicon carbide and aluminum oxide/aluminum silicate forms a basic material which solidifies particularly advantageously through the addition of a colloidal silicic acid solution in a sol-gel process and which in addition can be processed by means of casting under vibration. The silicic acid which initially is in the form of a sol or colloidal solution is converted into a gel by the above-mentioned sudden reduction in temperature and thus solidifies the molding compound, which can also be referred to as the cast compound or vibration compound. The actual drying and sintering process can then take place at comparatively low firing temperatures, as will be described in more detail below.

In an advantageous embodiment silicon carbide, with the chemical formula SiC, is used in a percentage by weight of between about 70% and about 90% for the molding compound in accordance with the invention.

For the molding compound produced in accordance with the invention as aluminum oxide it is particularly advantageous to use corundum, i.e. aluminum oxide in a trigonal structure with the chemical formula $Al_2O_3$, in particular with a percentage by weight between about 5% and about 20%.

The percentage by weight of the aluminum silicate used is particularly advantageously between about 5% and 30%, most preferably less than about 25%. The aluminum silicate is advantageously mullite with the chemical formula $3Al_2O_3\text{-}2SiO_2$ or $2Al_2O_3\text{-}1SiO_2$.

A particularly advantageous molded part can be produced if the basic molding compound contains microsilica ($SiO_2$) with a percentage by weight between 5% and 30%.

In addition, the molded part in accordance with the invention should advantageously be free of unbound silicon oxide $SiO_2$ or the percentage by weight of such silicon oxide should at least be less than about 10%. It is also advantageous if the molding compound is free of calcium aluminates.

The percentage by weight of the colloidal silicic acid solution added in accordance with the invention should advantageously be less than about 10%. Furthermore, the colloidal silicic acid solution should have a solids content of at least about 30% by weight.

To achieve good processability preferably a liquid, in particular water, should be added to the molding compound with a percentage by weight of more than about 1% and less than about 10%.

The maximum grain size should be typically between about 2 mm and about 5 mm. The percentage by weight of this grain fraction should be less than about 25%. Moreover, the percentage by weight of silicon carbide in the molding compound, the grain size of which is less than 0.5 mm, should not be more than 40% and preferably at least 15%.

Alternatively or additionally, the molding compound in accordance with the invention should be supplemented with less than about 20%, in particular less than about 15% percent by weight of reactive alumina.

The molded part fired in accordance with the invention should in its composition exhibit percentages by weight which essentially match those of the above-mentioned molding compounds. The open porosity of the fired molded part should be more than about 10%, in particular more than about 13% and less than about 35%. The bulk density of the fired molded part advantageously aimed to be achieved in accordance with the invention is less than about 3.5 g/cm$^3$, in particular less than about 3.0 g/cm$^3$.

With regard to the desired mechanical properties, the fired molded part in accordance with the invention should exhibit a mean bending strength under normal conditions of more than about 15.0 MPa. The mean bending strength is measured in a 3-point bending test.

The molded part produced in this way from a molding compound in accordance with the invention can be advantageously used as fireproof lining for combustion chambers of stationary gas turbines, in particular if the side facing the hot gas exhibits an EBC (environmental barrier coating) with a coating thickness of 5 mm or of preferably at least 10 mm adapted to the hot gas temperature. As already mentioned above, to produce the molded part the molding compound is produced under vibration by solidification on the basis of a colloidal silicic acid solution. To achieve this solidification, in accordance with the invention the ambient temperature of the molding compound is suddenly reduced to a temperature of less than about 0° C. and maintained there in particular for a period of more than about 15 minutes and less than about 2.5 hours. A cooldown temperature of the ambient environment from about −20° C. to about −40° C. is particularly preferred.

Having been cast into the mold, the molding compound is in accordance with the invention preferably fired at a temperature of between about 1300° C. and about 1650° C. Within this temperature range a temperature of between about 1350° C. and about 1650° C. is preferred for firing a ceramic. A fiber-reinforced ceramic is preferably fired at a temperature between about 1300° C. and about 1400° C. In accordance with the invention a firing temperature of between about 1300° C. and about 1600° C. is preferred for a structural ceramic.

BRIEF DESCRIPTION OF THE DRAWINGS

In the following an exemplary embodiment of a molding compound in accordance with the invention, a fired molded part produced from it, a fireproof lining formed using it and an associated method for producing a lining are explained in detail with reference to the attached schematic drawings.

The FIGURE shows a schematic flow diagram of a method for producing a fireproof lining including preparation of the molding compound used.

DETAILED DESCRIPTION OF INVENTION

A molded part envisaged as the fireproof lining for a combustion chamber of a stationary gas turbine is produced as in the FIGURE from a molding compound which in a first work step is mixed from essentially seven constituents.

These seven constituents are designated in the FIGURE with the reference numbers 6, 8, 10, 12, 14, 16 and 18 and contain in this sequence microsilica ($SiO_2$), silicon carbide (SiC), corundum ($Al_2O_3$), mullite ($2Al_2O_3 \cdot 1SiO_2$ or $3Al_2O_3 \cdot 2SiO_2$), silicic acid ($Si(OH)_4$), water ($H_2O$) and reactive alumina. The percentages by weight of these materials are in the case of silicon carbide (SiC) preferably between 70% and 90%, in the case of corundum as aluminum oxide between about 5% and 20%, in the case of mullite as aluminum silicate between about 5% and 30% and in the case of water between about 3% and 7%. The silicic acid is added with a percentage by weight of between about 3% and 10% and the microsilica ($SiO_2$) with a percentage weight of between 5% and 30%. The proportion of reactive alumina is between about 5% and 20%.

In a mixing process designated in the FIGURE with reference number 20 the stated constituents are mixed to form a molding compound which is subsequently cast under vibration into a mold in a casting process designated with reference number 22.

The mold prepared in this way is suddenly cooled from room temperature by being exposed to an atmosphere with a temperature of about −25° C. As a result of this sudden cooling of the molding compound in the mold the silicic acid present as a sol solidifies to form a gel. The molding compound as a whole is also solidified and particularly advantageously prepared for a final work step of drying and firing which is designated with reference number 26.

In this work step 26 the molding compound is fired at a sintering temperature of between about 1300° C. and about 1600° C. Given the comparatively low firing temperature, fiber reinforcements can be introduced in the molding compound in order to produce a fiber-reinforced ceramic.

The ceramic produced as the molded part—the end product—exhibits particularly advantageous mechanical properties with a particularly low tendency towards thermal cracking. This is due in particular to the fact that as a result of the mentioned sol-gel process as well as the high proportion of silicon carbide a special microcrack structure has been created which, among other things, leads for example to a big reduction in the lengths of edge cracks.

In this way the loss risk of ceramic heat shields on the lining and the number of maintenance and replacement cycles of heat shields can be reduced by means of the procedure in accordance with the invention. Overall, a longer service life can be achieved.

Another particular advantage of the invention is that the molding compound is cement-free (i.e. essentially exhibits no CaO) and, furthermore, owing to the low sintering temperature cost advantages are also achieved in the production method.

Given its physical, chemical and mineralogical properties the molding compound is highly suitable for the production of composite materials, including such of an oxidic nature. These include composite components, such as for example fiber-reinforced components on a CMC basis (ceramic matrix composites), components reinforced with structural ceramics and graduated components.

The invention claimed is:

1. A molding compound for producing a fireproof lining of a stationary gas turbine a combustion chamber, comprising:
   greater than 50% by weight of silicon carbide;
   between about 5% and 30% by weight of aluminum silicate; and
   between about 3% and 10% by weight of a colloidal silicic acid solution in sol form, wherein the colloidal silicic acid solution contains more than 30% by weight of solids; and between more than 5% and less than 30% by weight of microsilica ($SiO_2$).

2. The molding compound as claimed in claim 1, wherein more than 1% by weight and less than 10% by weight of water is added.

3. The molding compound as claimed in claim 2, further comprising between 5% and 20% by weight of reactive alumina.

4. The molding compound as claimed in claim 3, further comprising between 5% and 15% by weight of reactive alumina.

5. The molding compound as claimed in claim 1, wherein the silicon carbide has grain sizes that are not more than 0.5 mm.

6. The molding compound as claimed in claim 5, wherein the percentage by weight of silicon carbide with a grain size of below 0.5 mm is less than 40%.

7. The molding compound as claimed in claim 6, wherein the percentage by weight of silicon carbide with a grain size of below 0.5 mm is more than 15%.

* * * * *